United States Patent

Tang et al.

[11] Patent Number: 5,890,646
[45] Date of Patent: Apr. 6, 1999

[54] SOLDERING/DESOLDERING APPARATUS WITH SPRING-LOADED FLOATING VACUUM PICKUP DEVICE

[75] Inventors: Anthony Qingzhong Tang, Ellicott City; William J. Siegel, N. Bethesda; Elmer Raleigh Hodil, Jr., Timonium; Louis Abbagnaro, Silver Spring, all of Md.

[73] Assignee: Pace, Incorporated, Laurel, Md.

[21] Appl. No.: 802,679

[22] Filed: Feb. 19, 1997

[51] Int. Cl.⁶ ............................. B23K 1/012; B23K 1/018; B23K 31/02
[52] U.S. Cl. ..................................... 228/180.21; 228/20.5; 228/49.1; 228/49.5; 228/264
[58] Field of Search ....................... 228/20.5, 51, 180.21, 228/264, 49.1, 49.5

[56] References Cited

U.S. PATENT DOCUMENTS

| | | | |
|---|---|---|---|
| 4,295,596 | 10/1981 | Doten et al. | 228/264 |
| 4,528,746 | 7/1985 | Yoshimura | 228/264 |
| 4,552,300 | 11/1985 | Zovko | 228/264 |
| 4,899,920 | 2/1990 | Abbagnaro et al. | 228/11 |
| 4,972,990 | 11/1990 | Abbagnaro et al. | 228/6.2 |
| 5,560,531 | 10/1996 | Ruszowski | 228/264 |

FOREIGN PATENT DOCUMENTS 4-284968  10/1992  Japan ......................... 228/51

*Primary Examiner*—Patrick Ryan
*Assistant Examiner*—Jeffrey T. Knapp
*Attorney, Agent, or Firm*—Sixbey, Friedman, Leedom & Ferguson; David S. Safran

[57] ABSTRACT

A soldering/desoldering apparatus has a handpiece with a handgrip portion from which a hot air tube extends, a vacuum pickup tube which extends through the handgrip portion and hot air tube, one end of which has a suction cup mounted thereon and an opposite end of which is connected to a flexible vacuum line. Furthermore, an adjustment knob for axially shifting the vacuum pickup tube is provided on the handgrip portion and the vacuum pickup tube is resiliently displaceably supported relative to a displacement mechanism formed by a slide rod fixed to an inner wall of the handgrip portion and a rack member slidably disposed on the slide rod and geared to the adjustment knob. The pickup tube is fixed to a slide bracket which is slidably disposed on the slide rod between the ends of the rack member and between a pair of coil springs which act to position the slide bracket in a neutral position between the ends of the rack member. Additionally, nozzles having a fixed vacuum pickup extension can be used. According to another advantageous feature, a vacuum on/off switch and a hot air on/off switch are provided on the handgrip portion, and the vacuum on/off switch has a time delay function built for preventing termination of the vacuum supply unless the switch is depressed for longer than a predetermined time period.

18 Claims, 3 Drawing Sheets

SOLDERING/DESOLDERING APPARATUS WITH SPRING-LOADED FLOATING VACUUM PICKUP DEVICE

BACKGROUND OF THE INVENTION

1. Field of the Invention

The present invention relates to apparatus used for the repairing, reworking and/or production of electronic components and circuit boards and which use a flow of hot air to re-melt solder retaining the electronic components on a substrate, such as a circuit board. More specifically, the present invention relates to such apparatus which have a vacuum pickup device for placing and/or removing components on/from the substrate once the solder has been caused to flow.

2. Description of Related Art

In apparatus for the removal and installation of electronic components with respect to substrates, such as printed circuit boards, it is know to provide a vacuum pick-up device for placing and/or removing components on/from the substrate once the solder has been caused to flow. For example, U.S. Pat. Nos. 4,899,920 and 4,972,990 show stationary apparatus in which a vacuum tube with a suction cup on its end extends through the heating head. The vacuum tube is connected to a vacuum source and is axially displaceable within the heater head so as to be movable through the heater nozzle into contact with the component to be lifted off of a circuit board and then to remove it once the solder has melted, or to hold and place a component onto the circuit board. Movement of the pickup tube is produced solely via a manually turnable knob on the heater head.

Thus, this device depends on the touch sensitivity of the use to prevent pickup tube from pressing down too hard on the component during placement of the component or during attachment of the pickup to a mounted component. Likewise, for dismounting of a component, care must be taken to prevent lifting of the tube too early or too late, resulting in either detachment of the pickup device from the component or damage to the component due to insufficient melting of the solder in the former case or re-solidification of the solder in the latter case.

In another known system (JBC Model JT 6040), a combined pickup device and component shield well structure is used with a separate, handheld blower. The well is a tubular wall structure that is placed around a component to be removed from a substrate, and from which rise a stanchion which holds a vacuum pickup tube. The vacuum pickup tube is held in a raised position by a coil spring. In use, with the vacuum turned on, the pickup tube is manually lowered against the action of the spring until contact is made with the component, at which point the vacuum holds the pickup tube to the component and the pickup tube can then be released. The outlet end of the hot air blower is then directed into the shield well and hot air is blown against the solder connections to melt them. As soon as the solder connections have sufficiently melted to release the component leads, the spring force acting on the pickup tube causes it to lift, thereby removing the component from the substrate.

Such a device is advantageous since it ensures that component is lifted at the proper time. However, such a device is effective only for dismounting of components since the one-way spring action is counterproductive in those cases where a component is to be mounted. Furthermore, the need for separate dismounting and heating devices is less convenient and more costly than a single apparatus which can serve both functions.

Devices are also known (OK Industries Model FCT2228 handle of the FCR2200 rework system) in which the vacuum pickup tube is acted on by a spring in direction toward the component so as to provide a resilient cushion against which the pickup tube can be displaced when contact is made with a component to prevent it from being inadvertently damaged by the application of too great a downward force. However, such devices can pose problems when mounting of a component by applying too great a force to the component so that, upon melting of the solder, the leads splash the solder and/or pass through it in a way that produces defective solder connections. Furthermore, such arrangements do not provide for the automatic removal of a component.

Thus, there is a need for a vacuum pickup device that can be incorporated into handheld and stationary soldering and desoldering devices, and which can be used so as to gently place components to be mounted as well as gently engage mounted components, and which also has the capacity to automatically lift components off of a substrate as soon as the solder connections have been re-melted.

It is also noted that, up to this time, the handpieces of soldering/desoldering apparatus have relied either footswitches or handswitches on a separate master control unit for turning on and off the vacuum supply and/or hot air supply, with most units currently available merely having a master on/off switch, so that the vacuum pump and hot air supply are constantly running the entire time that the unit is on.

Thus, it is desirable to provide a more user friendly control arrangement for handpieces of soldering/desoldering apparatus. In particular, there is a need for such a control which provides independent cycling on and off of the hot air and vacuum supplies and does so on the handpiece in a way which will avoid problems of components being inadvertently dropped due to accidental actuation of the vacuum on-off switch.

SUMMARY OF THE INVENTION

In view of the foregoing, it is a primary object of the present invention to provide a vacuum pickup device that can be incorporated into handheld and stationary soldering and desoldering devices, and which can be used both to gently place components to be mounted and to gently engage mounted components, as well as to automatically lift components off of a substrate as soon as the solder connections have been re-melted.

In conjunction with the preceding object, it is a further object of the present invention to provide a user friendly control arrangement for handpieces of soldering/desoldering apparatus by which independent cycling on and off of the hot air and vacuum supplies can be achieved.

Yet another object of this invention is to achieve the preceding object in a way which avoids problems of components being inadvertently dropped due to accidental actuation of the vacuum on-off switch.

Still another object of the present invention is to achieve the foregoing objects while also enabling the handpiece to be usable in a manner in which a fixed distance is maintained between the end of an attached hot air nozzle and the suction cup of the vacuum pickup device.

These and other objects are achieved in accordance with a preferred embodiment of the present invention by a soldering/desoldering apparatus having a handpiece with a handgrip portion from which a hot air tube extends, a vacuum pickup tube which extends through the handgrip portion and hot air tube, one end of which has a suction cup mounted thereon and an opposite end is connected to a flexible vacuum line. Furthermore, displacement means for axially shifting the vacuum pickup tube is provided on said handgrip portion and the vacuum pickup tube is resiliently displaceably supported with respect to the displacement means. In particular, a slide rod is fixed to an inner wall of the handgrip portion, and a rack member is slidably disposed on the slide rod and is geared to a gear wheel that is attached to rotate with an external vacuum pick adjustment knob. The pickup tube is fixed to a slide bracket which is slidably disposed on said slide rod between the ends of the rack member a pair of identical coil springs being disposed about the slide rod, slightly compressed, between a respective end of the rack member and a respective side of the slide bracket in a manner balancing each other and acting to position the slide bracket in a neutral position between the ends of the rack member.

According to another advantageous feature, a vacuum on/off switch and a hot air on/off switch are provided on the handgrip portion, and telescopic reception a vacuum connection tube in the vacuum tube forms an air bleed means breaking the vacuum holding a component by said suction cup once the vacuum supply is terminated by said vacuum on/off switch, thereby releasing the component. Moreover, the vacuum on/off switch has a time delay function built in as a means for preventing termination of the vacuum supply unless the switch is depressed for longer than a predetermined time period, e.g., at least one half of a second, to prevent inadvertent releasing of the component by inadvertent contact with the vacuum on/off switch.

Additionally, for those cases where it is advantageous to fix the distance between the end of the hot air nozzle and the vacuum pickup, nozzles having a fixed vacuum pickup extension can be utilized with the handpiece of the present invention. For this purpose, the suction cup is transferred from the end of the vacuum pickup tube of the handpiece to the end of the fixed vacuum pickup extension of the nozzle, and the, now, bare end of the pickup tube is seated on the end of the pickup extension within a guide socket of the pickup extension. Adjustment for variations in height from one component to another can be compensated for by sliding the suction cup onto the pickup to a greater or lesser degree.

These and further objects, features and advantages of the present invention will become apparent from the following description when taken in connection with the accompanying drawings which, for purposes of illustration only, a single embodiment in accordance with the present invention.

DETAILED DESCRIPTION OF THE PREFERRED EMBODIMENT

Figure 1:
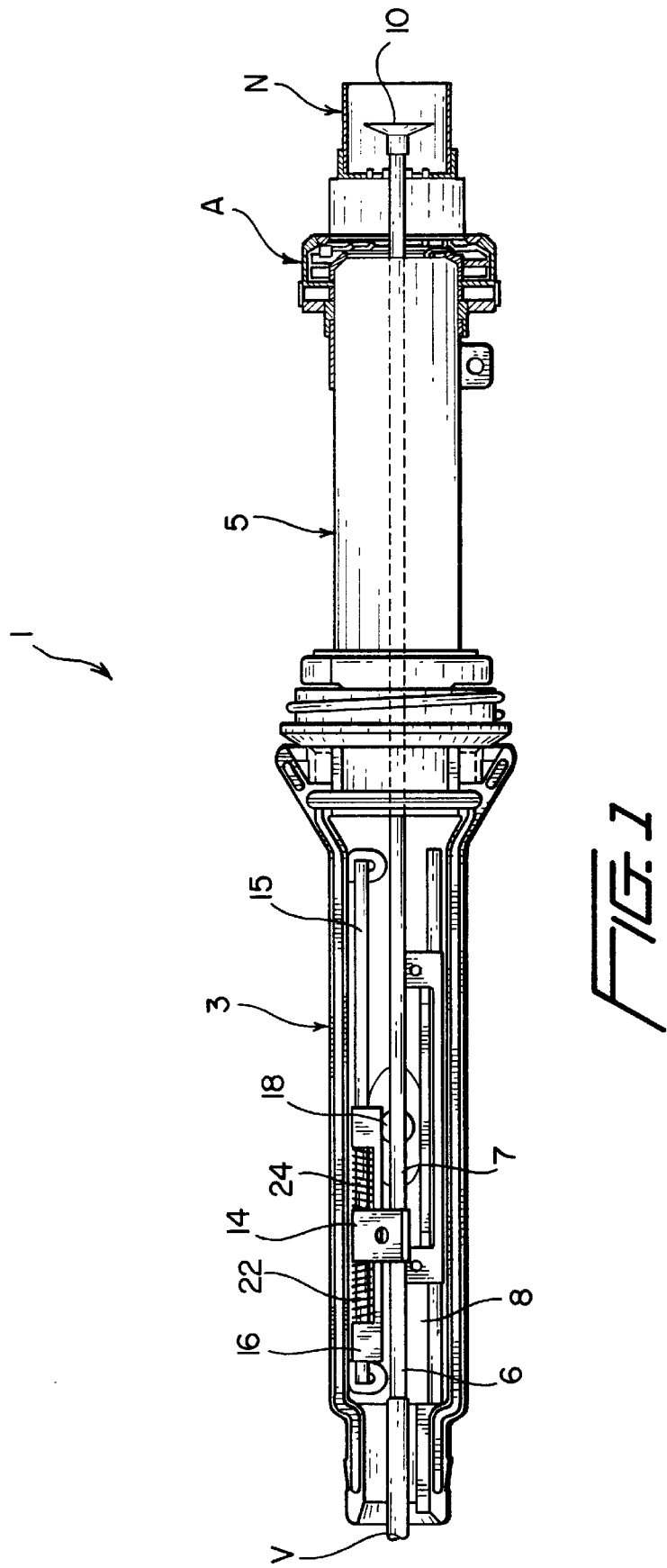
FIG. 1 is a cross-sectional view of a handpiece of a soldering/desoldering apparatus in accordance with a preferred embodiment of the present invention.

FIG. 1 shows the handpiece 1 of a soldering/desoldering apparatus in accordance with the present invention. With the exception of the structure of nozzle adapter A, which is the subject matter of a commonly owned, U.S. patent application Ser. No. 08/802,677 to Hodil, Jr., et al., which was filed on even date herewith (the substance of which is hereby incorporated by reference), and the below described handpiece control and vacuum pickup device features, this device may be of any conventional design, e.g., that of the Model TP65, THERMOPIK® handpiece sold by the assignee of the present application. Thus, no description need be made of the manner in which air is provided and heated, heating time is controlled or monitored, etc., especially since such aspects will vary from apparatus to apparatus, and variations therein have no direct affect on the below described features of the present invention.

Handpiece 1 has a handgrip portion 3 from which a hot air tube 5 extends, and upon the end of which one of a plurality of different nozzles N is mounted via the adapter A as described in the above-referenced commonly owned, co-pending application to Hodil, Jr., et al. A flexible vacuum line V is connected to an outer end of a vacuum line connection tube 6 which is fixed in the handgrip portion 3 by a fixed clamping bracket 8. A vacuum pickup device comprised of a vacuum pickup tube 7 and a suction cup 10 extends from within the handgrip portion 3, through hot air tube 5 and adapter A, into the nozzle N. Suction cup 10 has an opening which enables air to be drawn into the pickup tube 7 from the cupped side of the suction cup, as is known for suction cups for vacuum pickups.

Figure 2:
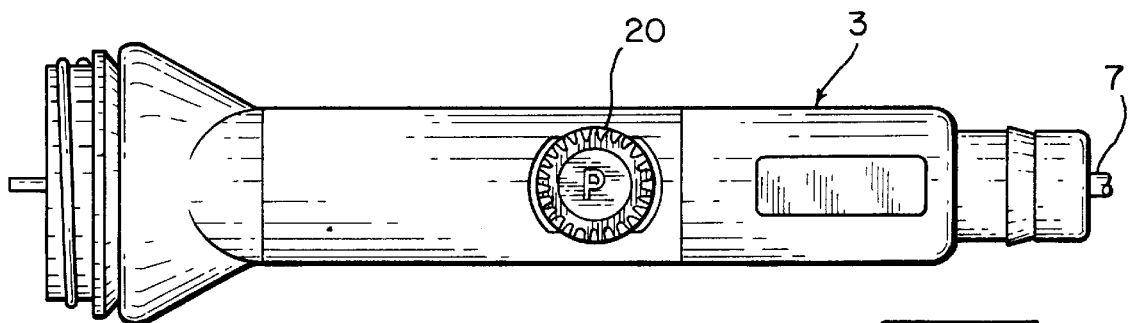
FIGS. 2, 3 & 4, are, respectively, side, top, and opposite side views of the handgrip portion of the FIG. 1 handpiece.
Figure 3:
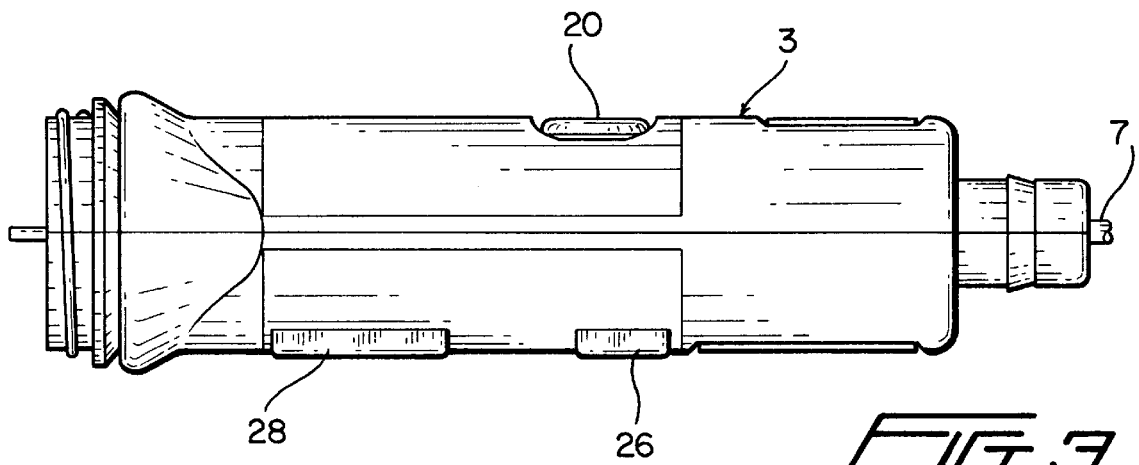
Figure 4:
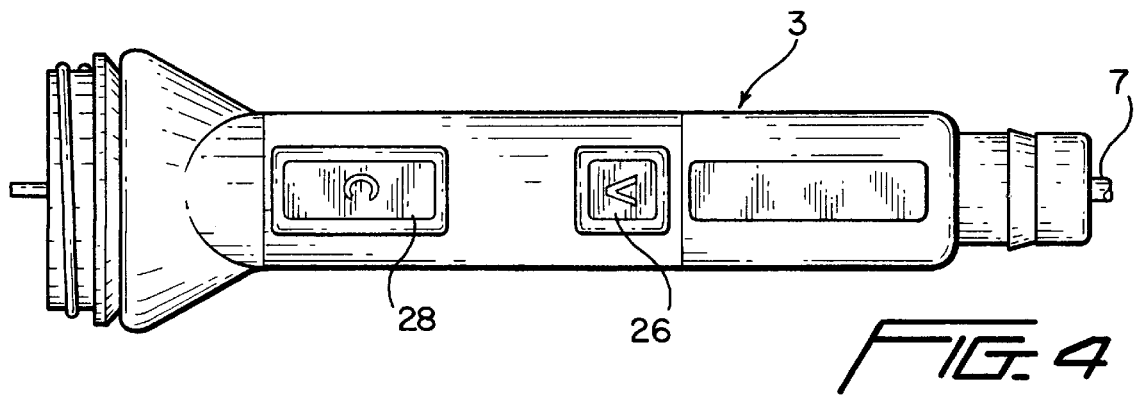

The pickup tube 7 has a slightly larger diameter than the fixed connection tube 6 and is telescopingly received over an inner portion of the connection tube so as to be slidable therealong. The pickup tube 7 is clamped to a slide bracket 14 which is slidably disposed on a slide rod 15 which, in turn, is fixed to an inner wall of the handgrip portion 3. Also slidably disposed on the slide rod 15 is a rack member 16 which is geared to a gear wheel 18 that is attached to rotate with rotation of the external vacuum pick adjustment knob 20 (shown on the outside of the handgrip portion 3 in FIGS. 2 & 3).

A pair of identical coil springs 22, 24 are disposed about the slide rod 15, each of which is slightly compressed between a respective end of the rack member 16 and a respective side of the slide bracket 14. As a result, the forces of the springs 22, 24, balance each other and act to position the slide bracket 14 in the neutral position shown in FIG. 1. In this neutral position, the slide bracket is about half-way between the ends of the rack member 16 and the suction cup 10 is approximately centered within the nozzle N.

As can be appreciated, the above-described arrangement produces a floating support for the vacuum pickup device in that it is freely, resiliently displaceable against the force of either of the two springs 22, 24. Thus, when engaging the suction cup 10 on the pickup tube 7 with a mounted electronic component or when using the pickup tube 7 and suction cup 10 to place an electronic component to be mounted, after initial contact is made, any excess application forces produced will not affect the electronic component. That is, if the rack member is continued to be moved by the knob 20 in a lowering direction after component engagement occurs, such movement will merely result in compression of the spring 22 without any further displacement of the pickup tube 7.

On the other hand, for component removal, once the pickup tube 7 has been lowered sufficiently to attach suction cup 10 to the component to be removed, by turning knob 20 so as to back off the rack member 16, an upward spring loading of the pickup device can be produced. That is, since the suction force will act to hold tube 7 to the component which is fixed on its mounting substrate, and with it slide bracket 14, the spring 24 will be compressed between the slide bracket 14 and the rack member 16 as the rack member 16 is backed off. Thus, as soon as the solder has been caused to sufficiently re-melt to release the leads of the electronic component, the force exerted by spring 24 will lift the component off of its mounting substrate as the spring 24 returns the pickup device to its neutral position.

While still being held by the suction cup 10, the component can, then, be transported to a storage tray, examination point, etc. by movement of the handpiece 1. At the desired location, by pressing of a vacuum on/off switch button 26 on the handgrip portion, the supply of suction to the suction cup can be terminated and the electronic component released. In this regard, releasing of the component is facilitated by the telescopic arrangement of tubes 6 and 7 since air can bleed into tube 7 from between it and connection tube 6 once the vacuum supply is terminated, thereby breaking the vacuum holding the component without having to provide any separate bleed valve or the like. On the other hand, to prevent inadvertent releasing of the component during transport by in advertent contact with switch button 26, preferably, the on/off switch is of the known type that has a delay function built in, so that the vacuum supply will not be terminated unless the switch is depressed for longer than a predetermined time period, e.g., for one half of a second. In order to terminate the supply of hot air during transport, preferably, a second on/off switch 28 is provided on the handgrip portion 3 for cycling on and off of the hot air supply.

From the foregoing, it should now be apparent how the present invention provides a vacuum pickup device that can be incorporated into handheld and stationary soldering and desoldering devices, and which can be used both to gently place components to be mounted and to gently engage mounted components, as well as to automatically lift components off of a substrate as soon as the solder connections have been re-melted. Further, it can be seen that a user friendly control arrangement for handpieces of soldering/desoldering apparatus is provided by which independent cycling on and off of the hot air and vacuum supplies can be achieved, without creating a problem of inadvertently dropping of a component due to accidental actuation of the vacuum on-off switch on the handpiece.

However, in some cases, such as those repetitive circumstances in which a large number of the same type of component is to be worked upon, it is advantageous to fix the distance between the end of the hot air nozzle N and the suction cup 10 of the vacuum pickup device. For those situations, the handpiece 1 is usable with nozzles N', such as those shown in FIGS. 5 & 6, having a fixed vacuum pickup extension 30 can be utilized with the handpiece of the present invention.

Figure 5:
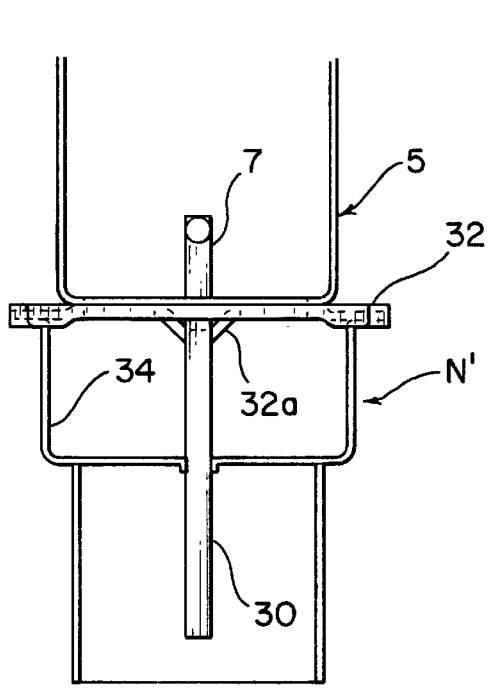
FIG. 5 is a cross-sectional view showing use of the handpiece with a square nozzle having a fixed vacuum pickup extension, and with the nozzle-mounting adaptor omitted for clarity.
Figure 6:
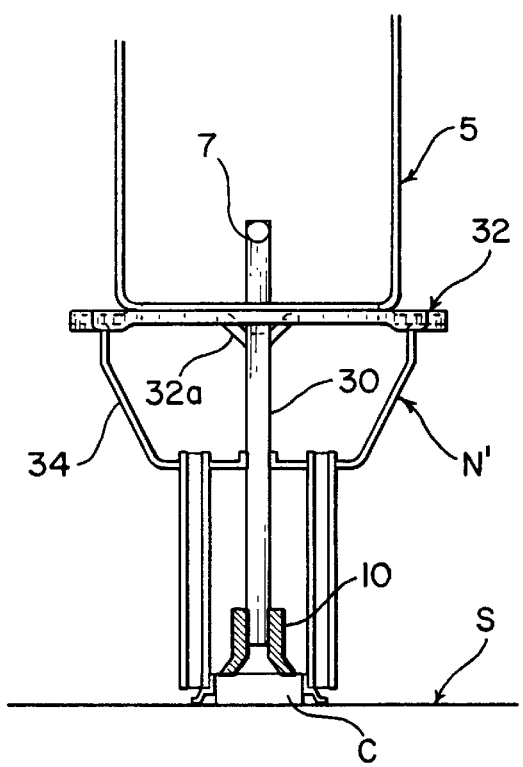
FIG. 6 is a cross-sectional view showing use of the handpiece with a double-slot nozzle having a fixed vacuum pickup extension in position overlying a component to be removed, and with the nozzle-mounting adaptor omitted for clarity.
Figure 7:
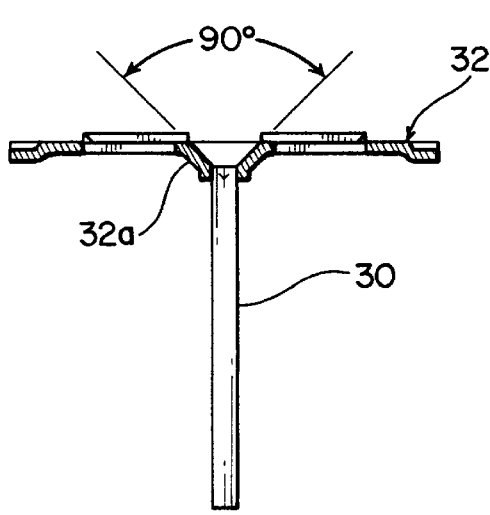
FIG. 7 is a cross-sectional of a nozzle mounting plate with a fixed vacuum pickup extension of the nozzles of FIGS. 5 & 6, taken along the line 7—7 in FIG. 8.
Figure 8:
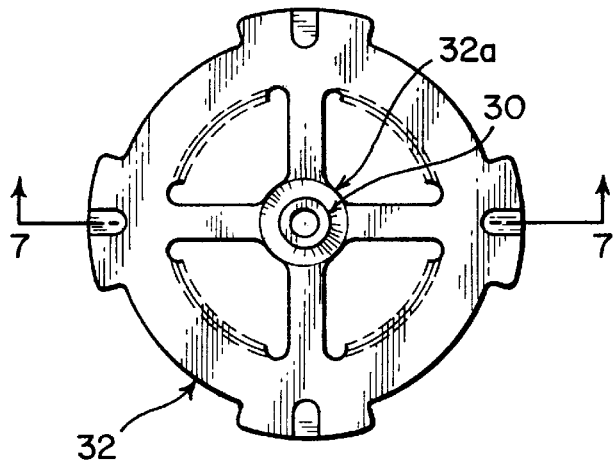
FIG. 8 is a top plan view of a nozzle mounting plate with a fixed vacuum pickup extension of the nozzles of FIGS. 5 & 6.

For this purpose, the suction cup 10 is removed from the end of the pickup tube 7, and after attachment of a nozzle N' of the type shown in FIGS. 5 & 6, the suction cup 10 is slid onto the end of the fixed vacuum pickup extension 30 of the nozzle N', which is fixed at the bottom of a conic guide socket 32a of a nozzle mounting plate 32, which mounting plate is fixed on top of an adapter skirt 34 of nozzle N'. Then, by turning of knob 20, the pickup tube 7 is lowered until the, now, bare end of the pickup tube 7 is firmly seated on the end of the vacuum pickup extension 30 within the conic guide socket 32a of nozzle mounting plate 32.

In this regard, for simplicity, the adapter A shown in FIG. 1 has been omitted from FIGS. 5 & 6. However, the above-referenced Hodil, Jr., et al., commonly-owned, co-pending application can be referred for the details of adapter A and for the manner in which such a mounting plate 32 can be attached to adapter A.

Adjustment for variations in height from one component to another can be compensated for by sliding the suction cup 10 onto the free end of the vacuum pickup extension 30 to a greater or lesser degree. Once set, the handpiece 1 can be repeatedly used to apply or remove any number of the same type component C with respect to a substrate S, such as a printed circuit board, without any further adjustments being required until the nozzle N' being used is to be changed for another. In this regard, this aspect of the present invention is not limited to use of the two nozzles N' shown in FIGS. 5 & 6. For example, any of the types of nozzles mentioned in the above-referenced Hodil, Jr., et al. application may be used merely by changing the open-centered mounting plate shown in that application for one having a conic guide seat 32a and vacuum pickup extension 30, the mounting plate 32 being otherwise identical to that of the commonly owned, Hodil, Jr., et al. application.

While a single embodiment in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A method of soldering electronic components to a substrate utilizing an apparatus having a handpiece with a handgrip portion from which a hot air tube extends, a vacuum pickup tube which extends through the handgrip portion and hot air tube, one end of which has a suction cup mounted thereon and an opposite end is connected to a flexible vacuum line, displacement means for axially shifting said vacuum pickup tube on said handgrip portion; and a resiliently displaceable support for said vacuum pickup tube with respect to said displacement means; comprising the steps of:

engaging the suction cup on the pickup tube with an electronic component to be mounted and holding the component to the suction cup by connecting the pickup tube with a source of vacuum;

suspending the electronic component above a surface upon which the electronic component is to be mounted via said pickup tube while applying sufficient hot air to solder on connection points of said surface to re-melt the solder;

upon melting of the solder, operating the displacement means for moving the pickup tube toward the surface upon which the electronic component is to be mounted and engaging connectors of the electronic component in the re-melted solder, then releasing the component from said suction cup and terminating the applying of hot air;

wherein, after initial contact is made between the electronic component and the surface upon which the component is being mounted, absorbing any excess application forces produced by further movement of the displacement means in an attaching direction by resiliently displacing said displaceable support with respect to said displacement means in a manner preventing further displacement of the pickup tube.

2. A method of soldering electronic components to a substrate according to claim 1, wherein said releasing of the component from said suction cup and terminating of the applying of hot air are performed using on/off switches on the handpiece.

3. A method of desoldering electronic components from a substrate utilizing an apparatus having a handpiece with a handgrip portion from which a hot air tube extends, a vacuum pickup tube which extends through the handgrip portion and hot air tube, one end of which has a suction cup mounted thereon and an opposite end of which is connected to a flexible vacuum line, displacement means for axially shifting said vacuum pickup tube on said handgrip portion; and a resiliently displaceable support for said vacuum pickup tube with respect to said displacement means; comprising the steps of:

connecting the pickup tube with a source of vacuum and lowering the pickup tube sufficiently to contact the electronic component to be removed and attaching the suction cup to the electronic component;

operating said displacement mechanism so as to back off the resilient support in a manner applying an upward spring loading to the pickup tube and without detaching the suction cup from said electronic component;

applying sufficient hot air to solder connections holding said electronic component to the substrate to re-melt the solder and to release the solder connections; and raising the electronic component off of the substrate by force exerted by said spring loading upon said re-melting of the solder and releasing of the solder connections.

4. A method of desoldering electronic components from a substrate according to claim 3, wherein, after sufficient contact is made with said electrical component to attach said suction cup thereto, absorbing any excess application forces produced by further movement of the displacement means in an attaching direction by resiliently displacing said displaceably supported with respect to said displacement means in a manner preventing further displacement of the pickup tube.

5. A method of desoldering electronic components from a substrate according to claim 3, comprising the further steps of:

transporting the electronic component while still being held by the suction cup by movement of the handpiece;

releasing the electronic component at a desired location by pressing of a vacuum on/off switch button on the handgrip portion to terminate the supply of suction to the suction cup.

6. A soldering/desoldering apparatus comprising a handpiece having a handgrip portion from which a hot air tube extends;

a vacuum pickup tube which extends through the handgrip portion and hot air tube, one end of which is connected to a flexible vacuum line;

a nozzle which is attachable to an outlet end of said hot air tube;

wherein displacement means for axially shifting said vacuum pickup tube is provided on said handgrip portion; wherein said vacuum pickup tube is displaceably supported with respect to said displacement means; wherein said nozzle has a fixed vacuum pickup extension mounted therein; and wherein said vacuum pickup tube is displaceable into engagement with an inlet end of the fixed vacuum pickup extension for communicating the pickup extension with said vacuum line via said vacuum pickup tube.

7. A soldering/desoldering apparatus according to claim 6, wherein a vacuum on/off switch and a hot air on/off switch are provided on the handgrip portion; wherein a telescopic connection is provided between said vacuum pickup tube and said vacuum line and forms an air bleed means breaking the vacuum holding a component by said suction cup once the vacuum supply is terminated by said vacuum on/off switch, thereby releasing the component; and wherein the vacuum on/off switch has a time delay function built in as a means for preventing termination of the vacuum supply unless the switch is depressed for longer than a predetermined time period to prevent inadvertent releasing of the component by inadvertent contact with the vacuum on/off switch.

8. A soldering/desoldering apparatus according to claim 6, wherein a suction cup is slidably, adjustably mounted on an outlet end of said vacuum pickup extension.

9. A soldering/desoldering apparatus according to claim 8, wherein at least one additional nozzle is interchangeably mountable on said hot air tube in place of said nozzle having the fixed vacuum pickup extension; wherein said additional nozzle has an open center through which said vacuum pickup tube is extendable; and wherein said suction cup is transferrable from the outlet end of said vacuum pickup extension to an outlet end of the vacuum pickup tube.

10. A soldering/desoldering apparatus according to claim 9, wherein said vacuum pickup tube is resiliently displaceably supported with respect to said displacement means.

11. A soldering/desoldering apparatus according to claim 10, wherein a slide rod is fixed to an inner wall of the handgrip portion; wherein a rack member is slidably disposed on said slide rod and is geared to a gear wheel that is attached to rotate with an external vacuum pick adjustment knob; and wherein the pickup tube is fixed to a slide bracket which is slidably disposed on said slide rod between ends of said rack member.

12. A soldering/desoldering apparatus according to claim 11, a pair of identical coil springs are disposed about the slide rod, each of the springs being slightly compressed between a respective end of the rack member and a respective side of the slide bracket in a manner balancing each other and acting to position the slide bracket in a neutral position between the ends of the rack member.

13. A soldering/desoldering apparatus comprising a handpiece having a handgrip portion from which a hot air tube extends;

a vacuum pickup tube which extends through the handgrip portion and hot air tube, one end of which has a suction cup mounted thereon and an opposite end of which is connected to a flexible vacuum line;

wherein displacement means for axially shifting said vacuum pickup tube is provided on said handgrip portion; and wherein said vacuum pickup tube is resiliently displaceably supported with respect to said displacement means.

14. A soldering/desoldering apparatus according to claim 13, wherein said pickup tube is connected to said vacuum line via a fixed connection tube; wherein said pickup tube has a slightly larger diameter than the fixed connection tube and is telescopingly received over an inner portion of the connection tube so as to be slidable therealong.

15. A soldering/desoldering apparatus according to claim 14, wherein a slide rod is fixed to an inner wall of the handgrip portion; wherein a rack member is slidably disposed on said slide rod and is geared to a gear wheel that is attached to rotate with an external vacuum pick adjustment knob; and wherein the pickup tube is fixed to a slide bracket which is slidably disposed on said slide rod between ends of said rack member.

16. A soldering/desoldering apparatus according to claim 15, a pair of identical coil springs are disposed about the slide rod, each of the springs being slightly compressed between a respective end of the rack member and a respective side of the slide bracket in a manner balancing each other and acting to position the slide bracket in a neutral position between the ends of the rack member.

17. A soldering/desoldering apparatus according to claim 14, wherein a vacuum on/off switch and a hot air on/off switch are provided on the handgrip portion; the telescopic reception of said connection tube in said vacuum tube forms an air bleed means breaking the vacuum holding a component by said suction cup once the vacuum supply is terminated by said vacuum on/off switch, thereby releasing the component; and wherein the vacuum on/off switch has a time delay function built in as a means for preventing termination of the vacuum supply unless the switch is depressed for longer than a predetermined time period to prevent inadvertent releasing of the component by inadvertent contact with the vacuum on/off switch.

18. A soldering/desoldering apparatus according to claim 17, wherein the time delay of the vacuum on/off switch is at least one half of a second.

* * * * *